United States Patent
Tenenboum et al.

(12)
(10) Patent No.: US 6,267,110 B1
(45) Date of Patent: Jul. 31, 2001

(54) DISPOSABLE HEATING UNIT FOR FOOD CONTAINERS

(75) Inventors: Mordehay Tenenboum, Kochav-Yair; Daniel Mandler, Jerusalem; Reuven Tal, Kiron; Yoel Meir, Othniel, all of (IL)

(73) Assignee: Convenience Heating Technologies Ltd., Jerusalem (IL)

( * ) Notice: Subject to any disclaimer, the term of this patent is extended or adjusted under 35 U.S.C. 154(b) by 0 days.

(21) Appl. No.: 09/513,183

(22) Filed: Feb. 25, 2000

(51) Int. Cl.$^7$ .................................................... F24J 1/00
(52) U.S. Cl. ......................... 126/263.01; 126/263.05; 126/262; 426/113
(58) Field of Search ............... 126/263.01, 263.02, 126/263.05, 263.08, 263.09, 261, 262; 62/4; 44/251; 252/70; 426/113, 114

(56) References Cited

U.S. PATENT DOCUMENTS

| | | | |
|---|---|---|---|
| 2,512,284 | * 6/1950 | Mumford | ........................ 126/263.01 |
| 3,998,749 | 12/1976 | Hydro et al. . | |
| 4,013,061 | 3/1977 | Trumble et al. . | |
| 4,033,323 | 7/1977 | Trumble et al. . | |
| 4,506,654 | 3/1985 | Zellweger et al. . | |
| 4,523,083 | 6/1985 | Hamilton . | |
| 4,819,612 | 4/1989 | Okamoto et al. . | |
| 4,914,920 | 4/1990 | Carnagie et al. . | |
| 4,949,702 | 8/1990 | Suzuki et al. . | |
| 4,981,130 | 1/1991 | Suzuki et al. . | |
| 5,012,795 | 5/1991 | Suzuki et al. . | |
| 5,018,505 | 5/1991 | Suzuki et al. . | |
| 5,020,509 | 6/1991 | Suzuki et al. . | |
| 5,035,230 | 7/1991 | Steidl et al. . | |
| 5,220,908 | 6/1993 | Iizuna et al. . | |
| 5,220,909 | 6/1993 | Pickard et al. . | |
| 5,299,556 | 4/1994 | Ando . | |
| 5,370,107 | 12/1994 | Yamauchi et al. . | |
| 5,421,835 | 6/1995 | Harding . | |
| 5,517,981 | 5/1996 | Taub et al. . | |
| 5,549,219 | 8/1996 | Lancaster . | |
| 5,593,792 | 1/1997 | Farrier et al. . | |
| 5,626,022 | 5/1997 | Scudder et al. . | |
| 5,935,486 | * 8/1999 | Bell et al. | ........................ 126/263.01 |

* cited by examiner

Primary Examiner—James C. Yeung
(74) Attorney, Agent, or Firm—Mark M. Friedman

(57) ABSTRACT

A disposable heating unit for use for heating the contents of a container, includes a first region containing a combination of at least two solid substances which undergo an exothermic chemical reaction which is not spontaneous at room temperature. Adjacent to the first region is a second region containing at least a first reagent. A storage cell is configured for releasing the liquid containing a second reagent into the second region. The first and second reagents undergo a spontaneous exothermic chemical reaction when brought into contact, thereby initiating the exothermic chemical reaction of the solid substances.

24 Claims, 6 Drawing Sheets

DISPOSABLE HEATING UNIT FOR FOOD CONTAINERS

FIELD AND BACKGROUND OF THE INVENTION

The present invention relates to disposable heating units for use for heating the contents of a container.

It is known to provide self-contained, self-heating devices for quickly heating liquid foods such as beverages, soups and the like, in circumstances in which conventional heat sources are either unavailable or inconvenient.

For ease of presentation, the devices may be classified according to the mechanism used for heat generation into four groups. A first group employs hydration processes, a second employs acid-base reactions. The third employs spontaneous oxidation-reduction reactions in aqueous solutions, and a fourth employs kinetically non-spontaneous oxidation-reduction reactions between solid oxidant and a solid reductant. Each group will now be addressed in turn.

Turning firstly to devices employing hydration processes, these devices generate heat by adding water onto an ionic solid, such as calcium oxide or calcium chloride. Examples of this type may be found in U.S. Pat. No. 5,626,022 to Scudder et al., U.S. Pat. No. 5,388,565 to Ou, and U.S. Pat. No. 4,773,389 to Hamasaki.

These devices have been found relatively simple to implement and use. However, the hydration processes used suffer from a number of inherent limitations. Firstly, the specific heat of the reactions employed is relatively low (roughly 100 Cal/ml), requiring the use of a large storage volume to provide a given heating effect. This problem is exacerbated by the significant heat energy which is absorbed by heating up the aqueous phase. Furthermore, the presence of significant quantities of water inherently limits the temperature of the heating unit to 100° C. such that the liquid food rarely reaches in excess of about 80° C.

A second approach employs mixing of acids and bases. A recent patent that takes advantage of this approach is U.S. Pat. No. 5,935,486 to Bell et al. that involves mixing of various organic and inorganic acids and bases.

The third approach uses oxidation-reduction reactions occurring in the aqueous phase. Examples of this type include U.S. Pat. No. 5,517,981 to Taub et al. in which magnesium is mixed with cupric chloride in the presence of water and the U.S. Pat. No. 3,998,749 to Hydro et al. where aluminum and cupric chloride are mixed in a mixture of aqueous and organic solvents.

Oxidation reactions of this type are highly exothermic, providing greater heat per unit storage volume than hydration reactions. However, the use of such reactions also presents certain problems. Firstly, the reactions tend to progress very rapidly, making it difficult to ensure efficient heat transfer to the liquid food. Furthermore, because of the need for the presence of some water, substantial energy is wasted in heating the water or boiling part of it. Finally, most reactions in this group produce significant quantities of dangerous gases such as hydrogen, and the waste solution may include hazardous substances, leading to numerous safety and environmental problems.

A fourth group of devices achieve significant advantages of efficiency, simplicity of structure and controllability by using solid phase self-propagating high-temperature synthesis (SHS) reactions, which include oxidation-reduction processes in the solid-state (such as thermite reactions). These reactions are basically redox reactions between metals or semimetals and metal oxide, such as aluminum, silicon and ferric oxide. In addition, these reactions are gas-less processes that involve harmless materials, and generate large amounts of heat per unit volume (or weight) of the reagents. The temperature of SHS reactions is above 1000° C., which requires good heat transfer and a safe metallic inner container. The rate of reaction may be controlled by appropriate choice of metals and metal oxides, grain size of the solids and path of reaction. Since the reactions are not kinetically spontaneous at room temperature, the components may be safely and conveniently mixed within a single chamber until activated by the user.

Self-heating devices based on various thermite reactions have been proposed. Examples include U.S. Pat. Nos. 4,506,654 to Zellweger et al., U.S. Pat. No. 4,819,612 to Okamoto et al., U.S. Pat. No. 4,949,702 to Suzuki et al., U.S. Pat. No. 5,020,509 to Suzuki et al., and U.S. Pat. No. 5,220,908 Iizuna et al. In all of these examples, the fuel is a mixture of a metal or alloys, such as silicon or ferrosilicon and a metal oxide, such as ferric oxide or cupric oxide.

Despite all of the above-mentioned advantages of solid-phase oxidation reactions, implementation of self-heating devices using these reactions is complicated by the need for an ignition system. Actuation of the chemical reaction is typically achieved by means of friction (similar to a match), by an electric ignition, or by manual ignition of an external fuse.

There is therefore a need for a self-heating-container assembly and heating unit for use therewith which would employ a solid-phase oxidation reaction without requiring the use of a complicated and expensive ignition system. It would also be highly advantageous to provide a method for heating the contents of a container according to which a primary solid-phase oxidation reaction would be initiated by an exothermic initiation reaction which provides the initiation energy by mixing small amounts of reagents which undergo a spontaneous exothermic chemical reaction.

SUMMARY OF THE INVENTION

The present invention provides a disposable heating unit for use for heating the contents of a container, self-heating-container assemblies employing such heating units, and corresponding methods for heating the contents of a container.

According to the teachings of the present invention there is provided, a disposable heating unit comprising a housing including: (a) a combination of at least two solid substances which undergo an exothermic chemical reaction which is kinetically not spontaneous at room temperature; (b) an initiation region containing at least a first reagent; and (c) a storage cell containing a liquid including at least a second reagent, the cell being configured for releasing the liquid into the initiation region, the first and second reagents being such that, when brought into contact at room temperature, they undergo a spontaneous exothermic chemical reaction, thereby initiating the exothermic chemical reaction of the solid substances.

According to a further feature of the present invention, the liquid is present in a quantity of less than ½ ml.

According to a further feature of the present invention, the combination of solid substances is located within a first region having a recess, at least part of the initiation region being disposed within the recess of the first region such that the at least part of the initiation region is substantially circumscribed by the first region.

According to a further feature of the present invention, the combination of at least two solid substances includes at least one substance selected from the group consisting of metals, semimetals, metal alloys and metal-semimetal alloys.

According to a further feature of the present invention, the combination of at least two solid substances includes at least one metal oxide.

According to a further feature of the present invention, the first reagent is a solid oxidant.

According to a further feature of the present invention, the initiation region further includes an admixture of at least one substance selected from the group consisting of metals, semimetals, metal alloys and metal-semimetal alloys.

According to a further feature of the present invention, the first reagent includes at least one compound selected from the group consisting of potassium permanganate, manganese oxide, potassium chlorate, barium peroxide and potassium nitrate.

According to a further feature of the present invention, the second reagent is an alcohol. Preferably, the liquid further includes a small quantity of an aromatic amine.

According to a further feature of the present invention, the second reagent includes at least one compound selected from the group consisting of ethanol, isopropanol, ethylene glycol and polyethylene glycol.

According to a further feature of the present invention, the storage cell is implemented as a frangible vial deployed so as to bring the first and second reagents into contact when the frangible vial is broken.

According to a further feature of the present invention, the storage cell is implemented as a foil packet deployed so as to bring the first and second reagents into contact when the foil packet is torn.

According to a further feature of the present invention, the foil packet encloses a spring element, the spring element being configured to provide a piercing element and a resilient spacer biased to a position in spaced relation to the piercing element such that the resilient spacer prevents contact between the piercing element and the foil packet, the spring being deformable under application of force through a first part of the foil packet such that the piercing element comes into contact with a second part of the foil packet so as to tear open the foil packet.

According to a further feature of the present invention, the storage cell is implemented as a syringe structure operative to inject the liquid into the initiation region.

There is also provided according to the teachings of the present invention, a disposable self-heating-container assembly for storing and heating a stored liquid, the container assembly comprising: (a) a container having a contained volume substantially enclosed by a plurality of walls including at least one side-wall, a base and a cover, at least one of the walls providing a recessed cavity extending into the contained volume; (b) the aforementioned heating unit disposed within the recessed cavity; and (c) an actuation mechanism configured to cause release of the liquid from the cell into the initiation region so as to initiate heating of the stored liquid within the contained volume.

According to a further feature of the present invention, the actuation mechanism is actuated by relative displacement between the container and the heating unit.

According to a further feature of the present invention, the cover includes a removable sealing element which is removable to provide a dispensing opening for dispensing the stored liquid from the container assembly, the container assembly further comprising a tool configured for operating the actuation mechanism, the tool being connected to the removable sealing element in such a manner as to prevent use of the tool to operate the actuation mechanism prior to removal of the removable sealing element.

According to a further feature of the present invention, there is also provided a layer of filter material deployed within the recessed cavity so as to filter and cool any gases released by the heating unit.

According to a further feature of the present invention, the container further includes a barrier deployed to subdivide the contained volume into a main storage volume for receiving the stored liquid and an additional storage compartment which is sealed against penetration of the stored liquid.

According to a further feature of the present invention, there is also provided a release mechanism for selectively opening the barrier to open the additional storage compartment to the main storage volume.

There is also provided according to the teachings of the present invention, a method for heating the contents of a container comprising: (a) providing a housing in thermal communication with the contents of the container, the housing containing a mixture of at least two solid substances which undergo a primary chemical reaction which is exothermic but is not kinetically spontaneous at room temperature; and (b) activating the primary chemical reaction by combining two reagents which undergo an exothermic chemical initiation reaction which is spontaneous at room temperature.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
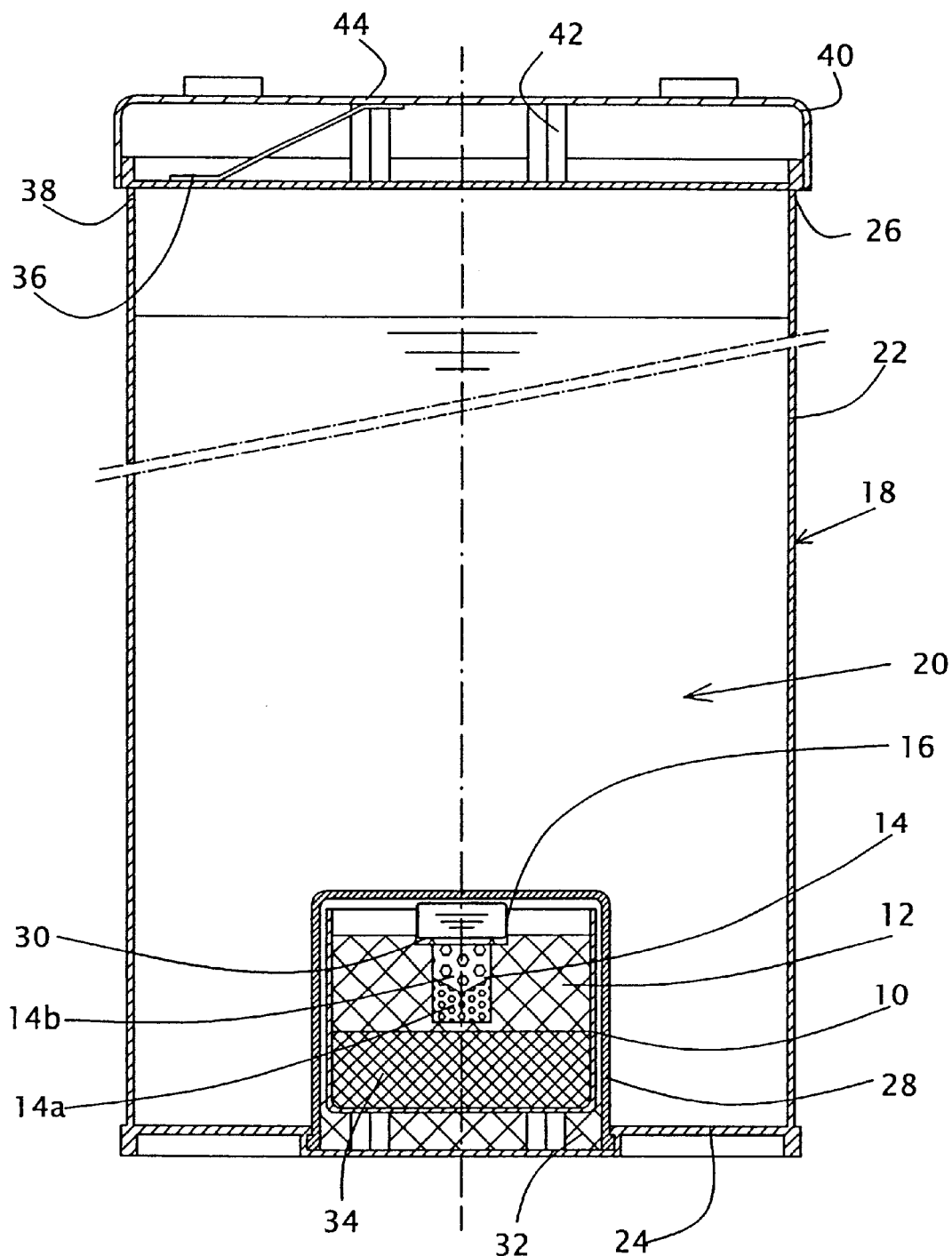
FIG. 1 is a vertical cross-section taken through a first embodiment of a disposable self-heating-container assembly, constructed and operative according to the teachings of the present invention, for storing and heating a stored liquid.

The present invention provides a disposable heating unit for use for heating the contents of a container, self-heating-container assemblies employing such heating units, and corresponding methods for heating the contents of a container.

The principles and operation of heating units according to the present invention may be better understood with reference to the drawings and the accompanying description.

Referring now to the drawings, FIGS. 1–5 show various embodiments of a disposable self-heating-container assembly, constructed and operative according to the teachings of the present invention, which employs a disposable heating unit for heating a stored liquid.

Referring generally to all of the embodiments, each of the assemblies employs a disposable heating unit which has a housing 10 including a first region 12 containing a combination of at least two solid substances which undergo an exothermic chemical reaction which is kinetically not spontaneous at room temperature, and a second region 14, adjacent to first region 12, which contains at least a first reagent. A storage cell 16, containing a liquid including at least a second reagent, is configured for releasing the liquid into second region 14. The first and second reagents are chosen such that, when brought into contact at room temperature, they undergo a spontaneous fast exothermic chemical reaction, thereby initiating the exothermic chemical reaction of the solid substances.

Operation of the assemblies is as follows. First, after opening the container, the first and second reagents are combined, thereby initiating a spontaneous exothermic reaction. Combining of these reagents may be achieved by various actuation mechanisms, as will be exemplified by the details of the specific embodiments to be discussed below. The heat generated by this reaction is sufficient to provide the required activation energy to initiate the reaction of the solid substances. This latter reaction then progresses, generating heat which is transferred through housing 10 to the contents of the container.

It will be readily apparent that the present invention provides considerable advantages over the prior art. Specifically, the use of a solid-phase oxidation reaction for the primary heating process provides the aforementioned advantages of controllability, structural simplicity and efficiency. At the same time, the complications and added expense of manual or pyrotechnic ignition systems are avoided by use of a chemical initiation reaction to initiate the primary reaction. The quantities of reagents provided for the initiation reaction are sufficiently small (preferably less than ½ ml of the liquid within storage cell 16) to avoid the aforementioned disadvantages associated with spontaneous liquid-phase reactions when used as the primary heat-generating reaction.

It should be noted that the present invention is applicable to a very wide range of applications in which a liquid (used herein to refer also to a mixture of solids together with a liquid) needs to be warmed, heated, boiled or cooked in circumstances in which conventional heat sources are unavailable, unsafe or inconvenient. In domestic applications, the invention may be used for heating water which may be used for preparing drinks, instant soups and the like, or for a range of other uses such as personal hygiene. Alternatively, beverages, soups or solids such as vegetables mixed in water or other liquids may be heated directly within the container. All such applications are referred to generically as "liquid food" applications. Other possible non-food applications include, but are not limited to, heating of fumigants and various chemicals for any purpose required.

In structural terms, the heating elements of the present invention may be produced in numerous forms suited to a wide range of different applications. In one particularly preferred set of applications which will be used herein to illustrate the principles of the present invention, the heating unit is part of a disposable container which is used to store a liquid prior to use, and then to heat and dispense the liquid on demand. The entire assembly is then discarded. In an alternative set of applications, the heating element may be a replaceable insert within a reusable container, forming what may be regarded as a kettle operated by single-use replaceable inserts. In yet a further set of applications, the heating unit may be implemented as a free-standing heating element for immersion into a container in a manner similar to an electric immersion heater.

It should be noted that the only essential characteristics of the primary and initiation reactions are that the primary reaction is a solid-solid exothermic reaction which is kinetically not spontaneous at room temperature and pressure while the initiation reaction is a solid-liquid exothermic reaction which is spontaneous when the reagents are brought together at room temperature and pressure. Preferably, the primary reaction is an oxidation reaction between a metal, semimetal, metal alloy, metal-semimetal alloy or mixtures thereof with one or more metal oxide. In a particularly preferred implementation, silicon is combined with a metal, typically iron or aluminum, to achieve a slower rate of reaction than when using a metal alone. An advantageous rate of reaction has been observed when using a ratio, by weight, of silicon to aluminum of greater than 1:1, and preferably about 2:1. A preferred example of the metal oxide is ferric oxide ($Fe_2O_3$). Thus, a preferred example of the overall composition of the solid substances of the primary reaction is about 22% silicon, about 11% aluminum and about 67% ferric oxide, by weight.

In addition to adjustment of the composition, the rate of reaction can be further adjusted by varying the mechanical properties of the mixture. Relevant parameters include the grain size of the particles, the degree of consolidation, and the path of the reaction as defined by the shape of the container.

With regard to the initiation reaction, this preferably employs a solid oxidant as the first reagent. Preferred examples include, but are not limited to, at least one of potassium permanganate, manganese oxide, potassium chlorate, barium peroxide and potassium nitrate. The initiation region (second region 14) is preferably separate from the first region 12 which contains the mixture for the primary reaction, but can optionally be implemented overlapping or intermixed therewith. The physical properties of the solid within second region 14 may be varied to affect the rate of reaction. By way of example, in the preferred examples shown, second region 14 is subdivided into a first sub-region 14a in which the reagent is compacted together and a second sub-region 14b, adjacent to storage cell 16, in which the reagent is present as a loose powder so the liquid reagent can penetrate easily into the solid and contact a large amount of the surface of the solid reagent. The second reagent is preferably an alcohol. Preferred examples include, but are not limited to, at least one of ethanol, isopropanol, ethylene glycol and polyethylene glycol. To ensure proper operation over a wide range of ambient temperatures, the alcohol is preferably chosen to have a freezing point below about 0° C. For implementations intended for use only in relatively warm climates, higher freezing point reagents such as glycerol may be used.

In most highly preferred embodiments, the solid oxidant within second region 14 is supplemented with one or more additional reagent which, together with the solid oxidant, define at least one additional intermediate reaction. This intermediate reaction is also kinetically non-spontaneous at room temperature but has a relatively low activation energy so as to begin easily once the initiation reaction starts. This helps to provide guaranteed progress of the reaction sequence to provide the relatively high activation energy for the primary reaction. In a preferred example, the solid oxidant in second region 14 is supplemented by a quantity of a metal and/or semi-metal or alloy thereof. A typical preferred example employs 22% aluminum, 5% silicon, and 73% $KMnO_4$.

As mentioned earlier, the present invention typically employs only relatively small quantities of reagents in the initiation reaction, particularly the liquid reagent, thereby avoiding the problems associate with larger scale use of such reactions. In order to minimize the quantities of reagents required to reliably initiate the primary reaction, it is a preferred feature that at least part of second region 14 is disposed within a recess formed in first region 12 so that at least part of second region 14 is substantially circumscribed by first region 12. In this configuration, and by using the aforementioned intermediate reaction, a quantity of not more than about 0.2 ml of the liquid fuel is generally required to reliably initiate the primary reaction. In this context, it should be noted that the size of second region 14 and storage cell 16 has been exaggerated in all of the figures for clarity of presentation.

In a further preferred feature of the present invention, a catalyst is provided to accelerate the occurrence of the initiation reaction on mixing of the reagents. Without such a catalyst, reactions of the types proposed typically take about 10 seconds to reach significant reaction rates under ambient conditions. This delay in operation can be effectively reduced to zero by use of a suitable catalyst. Preferred examples of suitable catalysts effective for this purpose include, but are not limited to, aromatic amines, and most preferably phenylene diamine or aniline, -or isomers thereof. One or more of these catalysts are preferably added in quantities totaling about 3–6% by volume to the liquid fuel.

Turning now to the features of the embodiment of FIG. 1 in more detail, this illustrates a first preferred implementation of storage cell 16 as a frangible vial, typically made of glass. Frangible vial 16 keeps the reagents separate prior to use. Then, when heating is required, the vial is broken so as to release the liquid into contact with the first reagent in region 14, thereby initiating the reactions.

FIG. 1 also illustrates what is believed to be a particularly advantageous configuration for the disposable self-heating-container assembly of the present invention. Specifically, there is shown a container 18 which has a contained volume 20 substantially enclosed by a plurality of walls including at least one side-wall 22, a base 24 and a cover 26. At least one of the walls, most preferably base 24, provides a recessed cavity 28 projecting into contained volume 20. Housing 10 is disposed within recessed cavity 28 so as to be displaceable relative to container 18. The frangible vial 16 is deployed between housing 10 and a surface of recessed cavity 28, preferably supported by a number of localized protrusions 30, so as to be broken by relative movement between housing 10 and container 18. Thus, displacement of housing 10 relative to container 18 serves as an actuation mechanism to cause release of the liquid from vial 16 into second region 14 to initiate heating.

Various precautions are preferably taken to avoid exposure of the user and proximal surfaces to the very high temperatures generated by the heating unit. Firstly, a layer of filter material 32 is preferably deployed within recessed cavity 28 externally with respect to the heating unit. This serves both as thermal insulation between the heating unit and the underlying surface and as a filter to filter and cool any gases released by the heating unit. Since the primary reaction is gasless, only small amounts of water vapor and carbon dioxide generated by the initiation reaction are typically released.

Additionally, a part of first region 12 closest to the outside of container 18 may be provided with a layer of material 34 which is stable at high temperatures and has a high heat-capacity, such as ceramics. This serves as a heat storage device, prolonging the period over which heat is given out by the heating unit. At the same time, material 34 provides an additional safety buffer zone between the intense heat of the reaction region and proximal surfaces external to the container.

An additional set of safety features is designed to avoid dangerous improper use of the container assembly. Specifically, it is important that the container should be opened prior to heating to prevent pressure build up during boiling of the liquid contents. To enable opening of container 18, cover 26 typically includes a removable sealing element 36 which is removable to provide a dispensing opening 38 through which the contents of the container are to be dispensed. The container assembly preferably also includes a tool 40 configured for operating the actuation mechanism. In the case of the actuation mechanism described above, tool 40 is preferably implemented as a number of projections 42, typically attached to a flat tray 44, and configured for insertion through channels formed through filter material 32 so as to push heating unit against the wall of recessed cavity 28. To ensure the proper sequence of opening followed by heating, tool 40 is preferably connected to removable sealing element 36 in such a manner as to prevent use of the tool to operate the actuation mechanism prior to removal of the removable sealing element. In the case shown here, tool 40 is initially supplied inverted over cover 26 as an additional outer cover. Removable sealing element 36 is connected to tool 40 via a pull-tab so that dispensing opening 38 is opened by the action of removing the outer cover formed by tool 40.

In a further safety feature, dispensing aperture 38 is preferably sufficiently small to prevent insertion of fingers into container 18. This ensures that, even if the contents of the container are emptied by mistake prior to the end of the heating process, the fingers of the user cannot inadvertently reach the hot internal surfaces adjacent to heating unit 10.

For additional safety and convenience of handling, the entire container 18 is preferably made from materials which can withstand high temperatures, typically steel or other metals approved for use with food, and is coated with an insulating material, typically plastic.

Figure 2A:
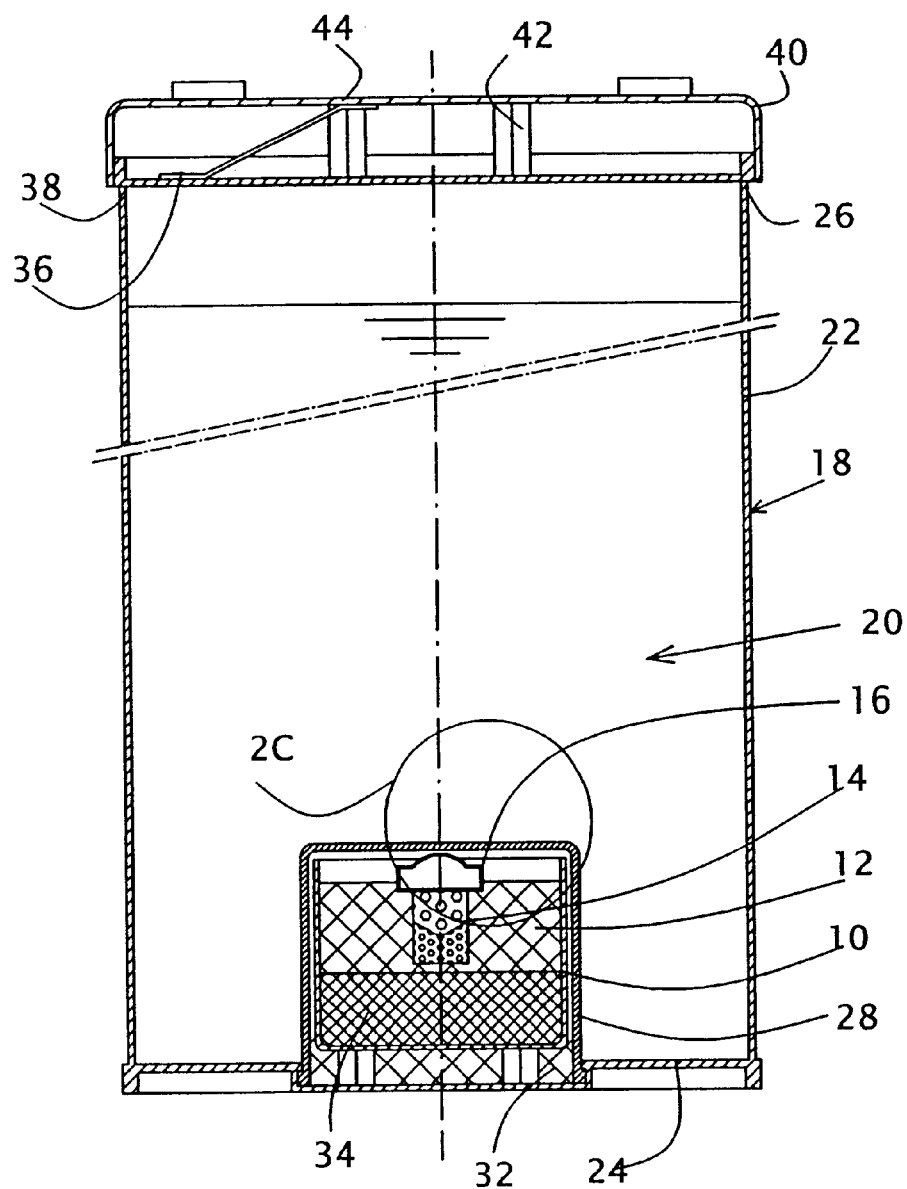
FIG. 2A is a vertical cross-section taken through a second embodiment of a disposable self-heating-container assembly, constructed and operative according to the teachings of the present invention.
Figure 2C:
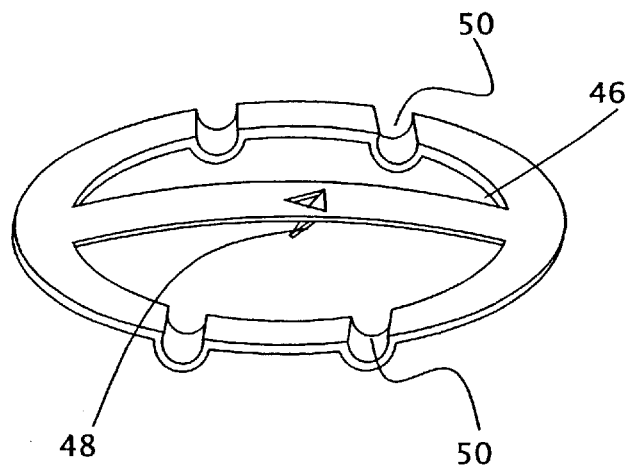
FIG. 2C is an isometric view of a spring element from the embodiment of FIG. 2A.
Figure 2B:
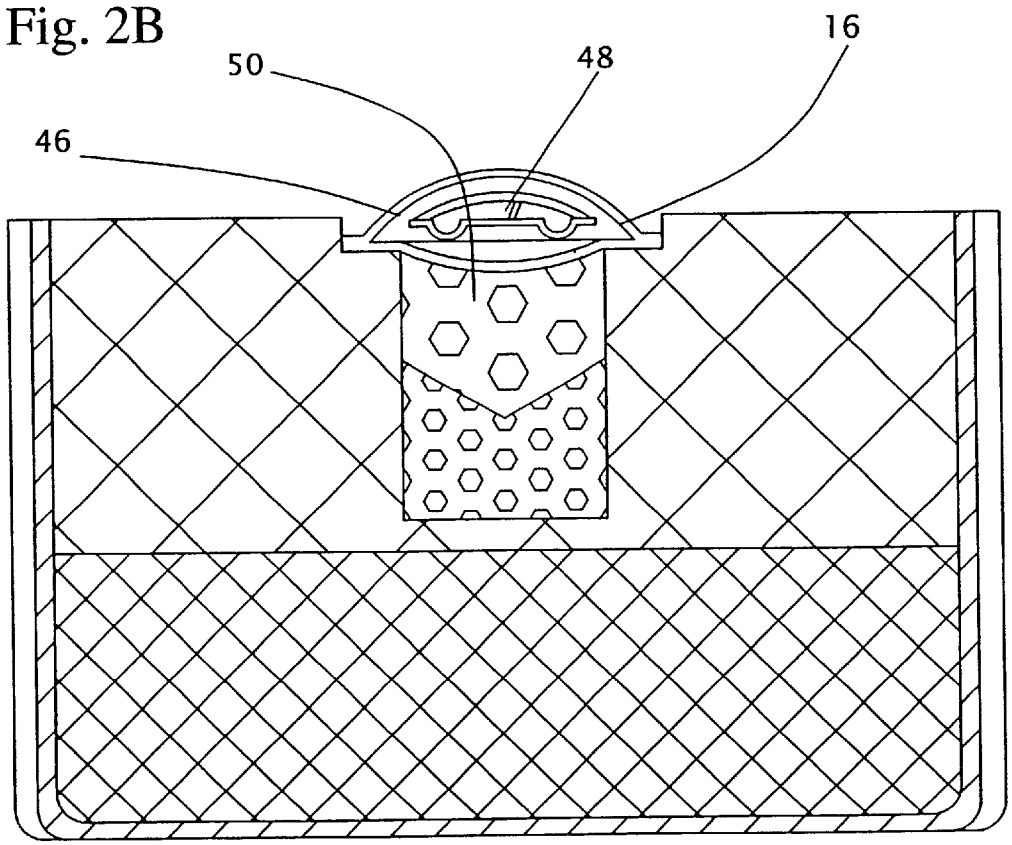
FIG. 2B is an enlarged view of the region of FIG. 2A designated I.

Turning now to the embodiment of FIGS. 2A–2C, this is generally similar to that of FIG. 1 but employs a different implementation of storage cell 16 as a foil packet. To provide controlled tearing of the packet on demand, foil packet 16 preferably encloses a specially formed spring element 46. As best seen in FIG. 2C, spring element 46 is formed with a piercing element 48 and a number of resilient spacers 50 biased to a position in spaced relation to piercing element 48. In a normal unflexed state of spring element 46, resilient spacers 50 prevent contact between piercing element 48 and foil packet 16. When force is applied through one surface of foil packet 16, spring element 46 is deformed such that piercing element 48 comes into contact with the opposite surface of foil packet 16 so as to tear open the foil packet and release the liquid reagent onto the first reagent in second region 14. Here too, the force required for actuation is preferably provided by relative movement of heating unit 10 relative to container 18.

In all other respects, this embodiment is similar in structure and function to the embodiment of FIG. 1 described above.

Figure 3:
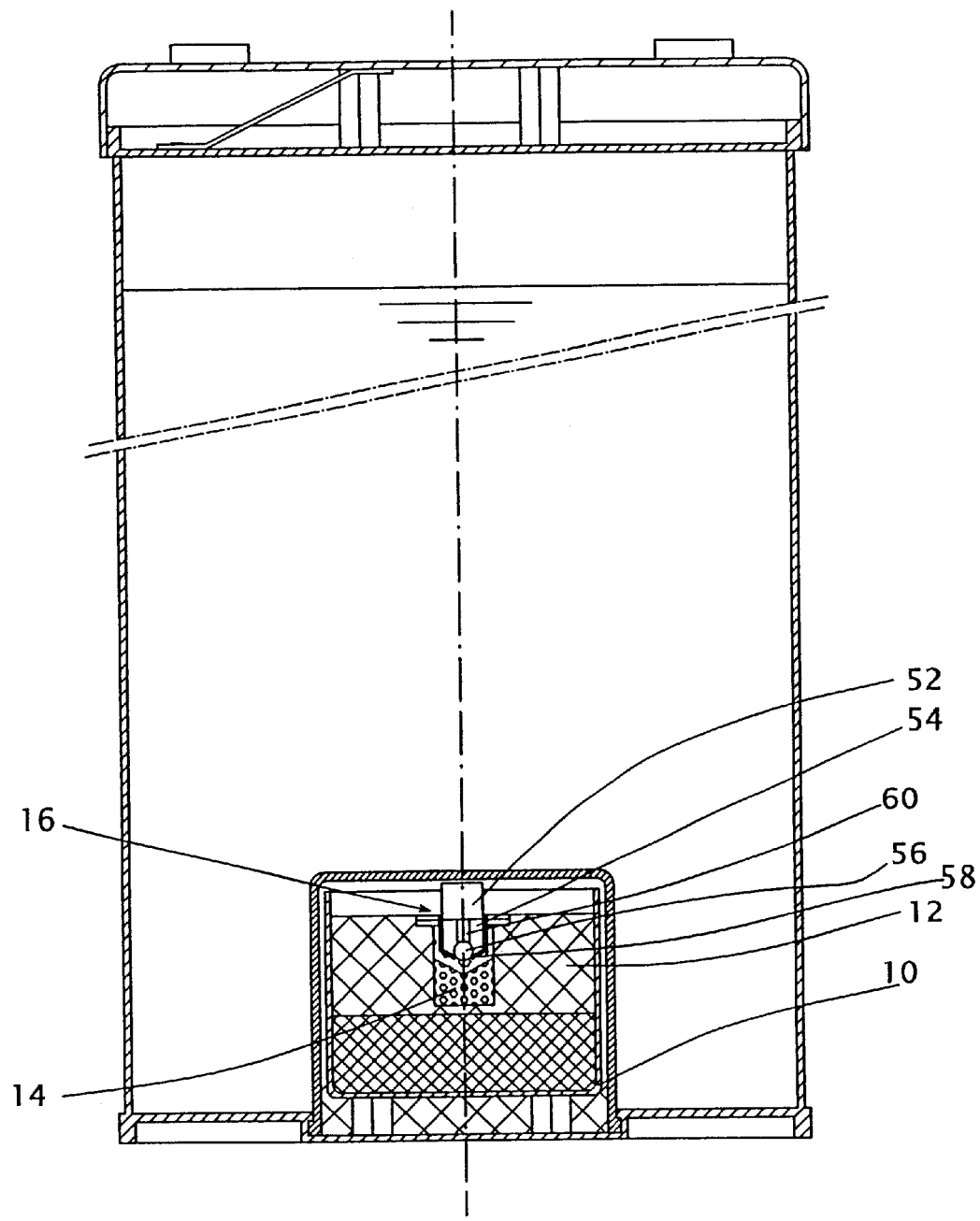
FIG. 3 is a vertical cross-section taken through a third embodiment of a disposable self-heating-container assembly, constructed and operative according to the teachings of the present invention.

Turning now to FIG. 3, this shows a further embodiment in which storage cell 16 is implemented as a syringe structure operative to inject the contained liquid into second region 14. This implementation allows optimal reduction of the volume of liquid used since the positive displacement of the liquid ensures that substantially all of the small quantity of liquid present is effectively transferred to second region 14.

In a preferred implementation as shown, the syringe structure is provided by a piston 52 slidable within a small cylinder 54 which is mounted within, or adjacent to, second region 14. The liquid is initially contained within cylinder 54 either by a frangible seal or, as in the case illustrated, by a valve. In the case shown, a valve is formed by a ball 56 pressed against a flexible inwardly inclined flange 58 by an actuator rod 60 associated with piston 52. When piston 52 advances, rod 60 pushes against ball 56 which deflects flange 58 and is forced outwards. Piston 52 is then effective to expel the liquid from cylinder 54 into second region 14. Here again, the actuation mechanism may optionally be operated by relative movement between heating unit 10 and container 18.

In all other respects, this embodiment is similar in structure and function to the embodiment of FIG. 1 described above.

Figure 4:
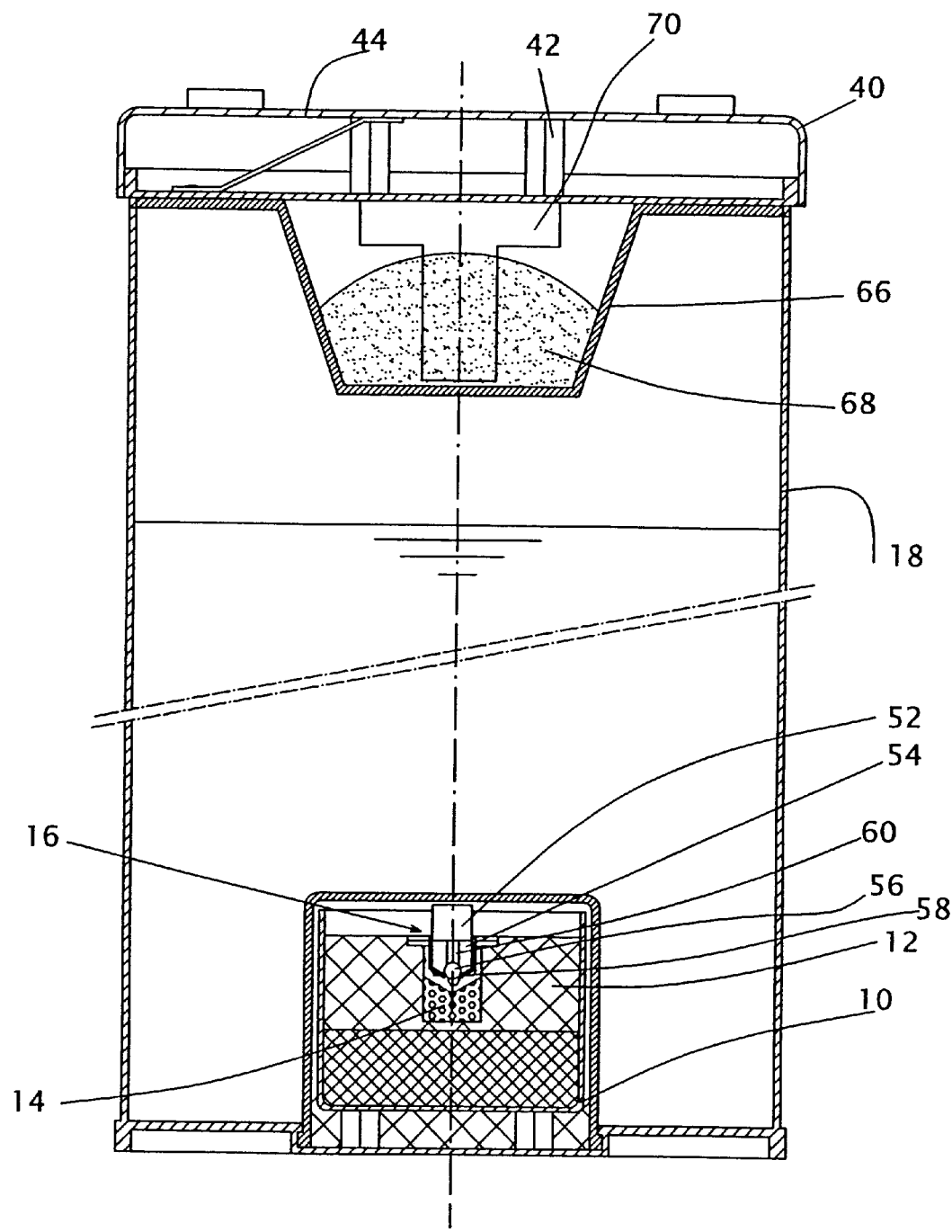
FIG. 4 is a vertical cross-section taken through a variant of the embodiment of FIG. 3, illustrating the provision of an additional compartment for a food component.

Referring now to FIG. 4, this shows a variation of the implementation of FIG. 3 in which container 18 features an additional compartment 66 for containing a food component 68. This variant, which may equally be implemented using the structures of the other embodiments described herein, is particularly useful for storing solids used for preparation of a food, beverage, soup or the like which must be kept dry prior to use. Typical examples include, but are not limited to, water soluble, or partially soluble, mixtures for the preparation of instant soup, instant coffee or instant tea, a tea bag or other infusion for preparation of tea, herbal tea, coffee or other drinks, and solid foods such as noodles, rice, mashed potatoes and other foods commonly used in instant hot meals. Clearly, multiple additional compartments could readily be provided in any case in which separate storage of components or separate sequential mixing of different components is desired.

Structurally, compartment 66 is shown here in a preferred implementation as a foil barrier which can be ripped opened by application of pressure on an actuator 70 which becomes accessible after removal of outer cover (tool) 40. This structure is suited to applications where mixing is required either immediately prior to, or subsequent to, heating of the liquid. Optionally, the various elements may be interconnected in such a manner to ensure opening of compartment 66 at a predefined stage of use and/or as a direct result of actuation of the heating process.

Figure 5:
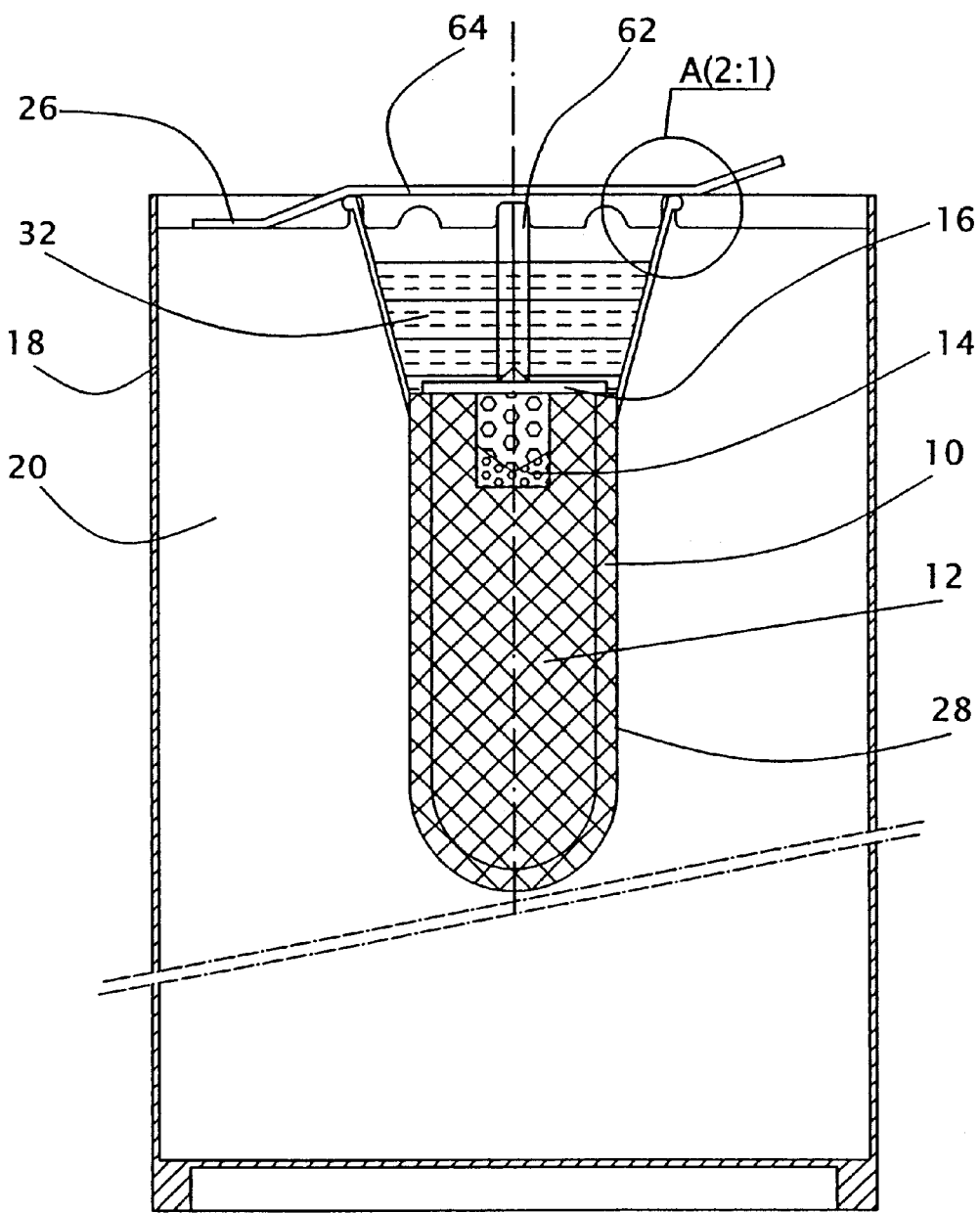
FIG. 5 is a vertical cross-section taken through a fourth embodiment of a disposable self-heating-container assembly, constructed and operative according to the teachings of the present invention.

Turning finally to FIG. 5, it should be noted structural implementations of the present invention may vary widely with respect to numerous features described in the non-limiting examples provided herein. For example, it should be noted that the heating element may optionally be located in positions other than in base 24. By way of example, FIG. 5 shows an implementation in which recessed cavity 28 is formed in cover 26.

In the case shown, storage cell 16 is implemented as a frangible vial, similar to that of FIG. 1, although other implementations can clearly be used. The actuation mechanism here is particularly simple, employing a manually operated actuator rod 62 to break vial 16 directly. Premature actuation of actuator rod 62 is avoided by providing an enlarged pull-tab 64 for removable sealing element 36 which obstructs access to actuator rod 62 prior to opening of the container. In all other respects, the structure and operation of this embodiment may be understood by analogy with the embodiment of FIG. 1 described above.

It will be appreciated that the above descriptions are intended only to serve as examples, and that many other embodiments are possible within the spirit and the scope of the present invention.

What is claimed is:

1. A disposable heating unit comprising a housing including:
   (a) a combination of at least two solid substances which undergo an exothermic chemical reaction which is kinetically not spontaneous at room temperature;
   (b) an initiation region containing at least a first reagent; and
   (c) a storage cell containing a liquid including at least a second reagent, said cell being configured for releasing said liquid into said initiation region, said first and second reagents being such that, when brought into contact at room temperature, they undergo a spontaneous exothermic chemical reaction, thereby initiating said exothermic chemical reaction of said solid substances.

2. The heating unit of claim 1, wherein said liquid is present in a quantity of less than ½ ml.

3. The heating unit of claim 1, wherein said combination of solid substances is located within a first region having a recess, at least part of said initiation region being disposed within said recess of said first region such that said at least part of said initiation region is substantially circumscribed by said first region.

4. The heating unit of claim 1, wherein said combination of at least two solid substances includes at least one substance selected from the group consisting of metals, semimetals, metal alloys and metal-semimetal alloys.

5. The heating unit of claim 1, wherein said combination of at least two solid substances includes at least one metal oxide.

6. The heating unit of claim 1, wherein said first reagent is a solid oxidant.

7. The heating unit of claim 6, wherein said initiation region further includes an admixture of at least one substance selected from the group consisting of metals, semimetals, metal alloys and metal-semimetal alloys.

8. The heating unit of claim 1, wherein said first reagent includes at least one compound selected from the group consisting of potassium permanganate, manganese oxide, potassium chlorate, barium peroxide and potassium nitrate.

9. The heating unit of claim 1, wherein said second reagent is an alcohol.

10. The heating unit of claim 9, wherein said liquid further includes a small quantity of an aromatic amine.

11. The heating unit of claim 1, wherein said second reagent includes at least one compound selected from the group consisting of ethanol, isopropanol, ethylene glycol and polyethylene glycol.

12. The heating unit of claim 1, wherein said storage cell is implemented as a frangible vial deployed so as to bring said first and second reagents into contact when said frangible vial is broken.

13. The heating unit of claim 1, wherein said storage cell is implemented as a foil packet deployed so as to bring said first and second reagents into contact when said foil packet is torn.

14. The heating unit of claim 13, wherein said foil packet encloses a spring element, said spring element being configured to provide a piercing element and a resilient spacer biased to a position in spaced relation to said piercing element such that said resilient spacer prevents contact between said piercing element and said foil packet, said spring being deformable under application of force through a first part of said foil packet such that said piercing element comes into contact with a second part of said foil packet so as to tear open said foil packet.

15. The heating unit of claim 1, wherein said storage cell is implemented as a syringe structure operative to inject said liquid into said initiation region.

16. A disposable self-heating-container assembly for storing and heating a stored liquid, the container assembly comprising:
   (a) a container having a contained volume substantially enclosed by a plurality of walls including at least one side-wall, a base and a cover, at least one of said walls providing a recessed cavity extending into said contained volume;
   (b) the heating unit of claim 1 disposed within said recessed cavity; and
   (c) an actuation mechanism configured to cause release of said liquid from said cell into said initiation region so as to initiate beating of the stored liquid within said contained volume.

17. The container assembly of claim 16, wherein said actuation mechanism is actuated by relative displacement between said container and said heating unit.

18. The container assembly of claim 16, wherein said cover includes a removable sealing element which is removable to provide a dispensing opening for dispensing the stored liquid from the container assembly, the container assembly further comprising a tool configured for operating said actuation mechanism, said tool being connected to said removable sealing element in such a manner as to prevent use of said tool to operate said actuation mechanism prior to removal of said removable sealing element.

19. The container assembly of claim 16, wherein said recessed cavity is provided in said base.

20. The container assembly of claim 16, wherein said recessed cavity is provided in said cover.

21. The container assembly of claim 16, further comprising a layer of filter material deployed within said recessed cavity so as to filter and cool any gases released by said heating unit.

22. The container assembly of claim 16, wherein said container further includes a barrier deployed to subdivide said contained volume into a main storage volume for receiving the stored liquid and an additional storage compartment which is sealed against penetration of the stored liquid.

23. The container assembly of claim 22, further comprising a release mechanism for selectively opening said barrier to open said additional storage compartment to said main storage volume.

24. A method for heating the contents of a container comprising:
   (a) providing a housing in thermal communication with the contents of the container, the housing containing a mixture of at least two solid substances which undergo a primary chemical reaction which is exothermic but is not kinetically spontaneous at room temperature; and
   (b) activating said primary chemical reaction by combining two reagents which undergo an exothermic chemical initiation reaction which is spontaneous at room temperature.

* * * * *